Nov. 16, 1926. 1,607,073
G. A. GROS
MACHINE AND METHOD OF SUPPLYING WORK THERETO
Filed Feb. 12, 1923

Inventor
Gustave A. Gros
by H. A. Pattison.
Atty.

Patented Nov. 16, 1926.

1,607,073

UNITED STATES PATENT OFFICE.

GUSTAVE ADOLPH GROS, OF RIVERSIDE, ILLINOIS, ASSIGNOR TO WESTERN ELECTRIC COMPANY, INCORPORATED, OF NEW YORK, N. Y., A CORPORATION OF NEW YORK.

MACHINE AND METHOD OF SUPPLYING WORK THERETO.

Application filed February 12, 1923. Serial No. 618,749.

This invention relates to improvements in machines and methods of supplying work thereto and more particularly to methods of feeding work material to molding machines.

In machines wherein work material remains for a comparatively long period of time while the article is being formed it is especially desirable to utilize the machine to its fullest extent by forming a plurality of articles in one operation of the machine and by supplying work material to the machine in a practically uninterrupted manner.

In accordance with one method of molding articles composed of plastic materials, the material is placed in a heated mold while in a semi-plastic state, after which the mold is placed in the machine and subjected to pressure. The mold is then withdrawn from the machine and the completed article is removed therefrom, after which the mold is refilled with work material for reinsertion into the press.

The object of this invention is to expedite the simultaneous manufacture of a plurality of articles by supplying work material to a machine in a practically uninterrupted manner.

Figure 1:
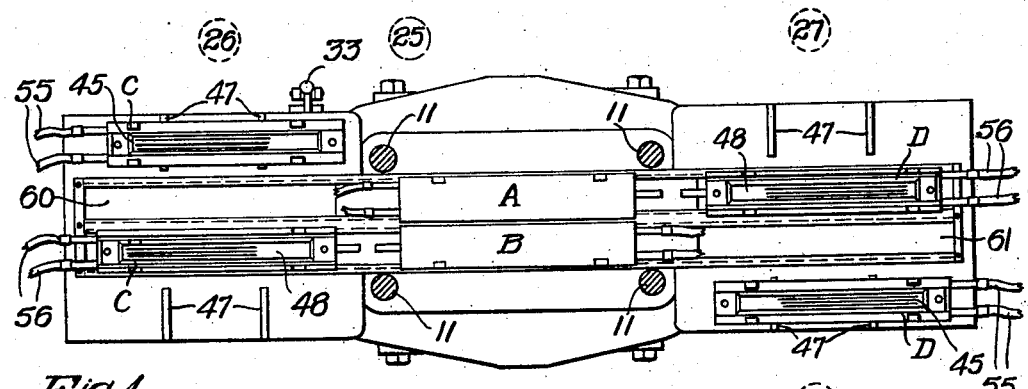
Figure 2:
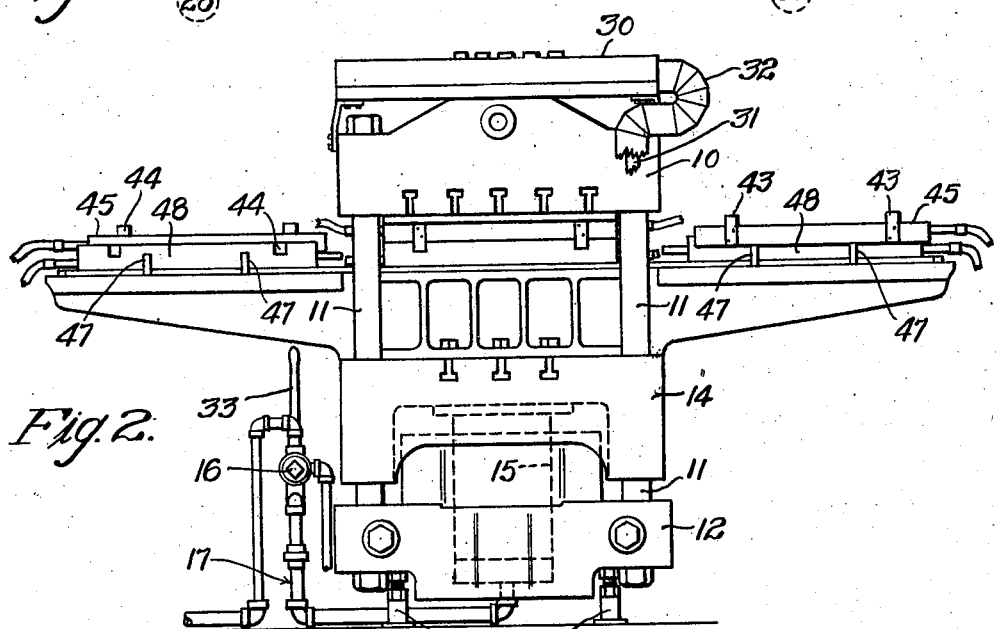
Figures 3, 4:
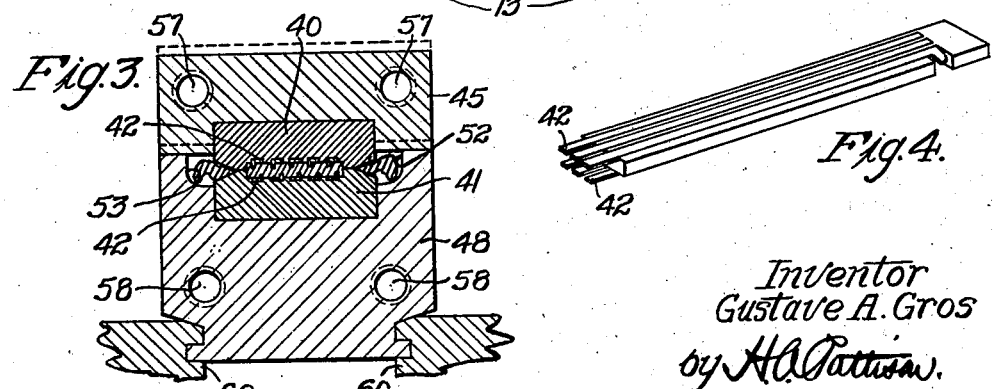

This and other features of the invention not specifically mentioned, will clearly appear from the following description and the accompanying drawings in which, Figs. 1 and 2 show plan and side elevations of a molding machine embodying the invention;

Fig. 3 shows a cross-sectional view of the mold which may be employed in such a machine, and Fig. 4 shows a perspective view of an article which may be produced by the machine shown in the other figures.

Referring to the drawings in which like numerals are applied to similar parts in the various figures, a stationary platen 10 is supported by the upper ends of vertical posts 11 which are secured in a base member 12 supported upon the floor by means of members 13. Sliding upon the posts 11 is a movable platen 14 which responds to the actuation of a plunger 15 operated by any suitable power means, such as hydraulic pressure controlled by a valve 16 included in a pipe line indicated generally by the character 17. A lever 33 provides an easily operated means for opening and closing the valve 16. At each end of the press and movable with the platen 14 is an extension platform, over the surface of which and extending through the pressing area of the machine are two parallel tracks or ways 60 and 61 engaging the bottom portions 48 of molds A to D inclusive as shown in detail in Fig. 3. Raised supports 47 are provided upon the platforms for maintaining the upper portions 45 of the molds at a convenient height while being prepared. A supply of work material which may be of any character suitable for molding may be kept upon a plate 30 which is maintained at a constant temperature by means of steam or some other heating agent entering through a pipe 31 covered by heat insulating material 32. The operator at position 25 controls the actuation of the platen 14 while the operators at positions 26 to 29 inclusive remove the completed articles from, and refill the molds with work material and thereafter reinsert the refilled molds into the machine.

The molds are provided with separable upper and lower body portions 45 and 48 respectively, each of which may be maintained at a predetermined constant temperature by steam or other suitable heating agent supplied through pairs of pipes 55 and 56 into openings 57 and 58 respectively. Members 40 and 41 suitably secured in the body portions 45 and 48 respectively are designed to position the angular metal insert strips 42 and to incorporate such inserts into a molded article of the proper shape and size and which may be suitable for use in electrical apparatus. Overflow chambers 52 and 53 are provided in the lower body portion 48 to receive the excess material which may not be compressed within the mold portion proper and is forced out of such portion by the action of the machine. Members 43 attached to the portion 45 engage recesses 44 in the side walls of the portion 48 to properly position the members 40 and 41 when the mold is assembled.

In the position of the machine shown on the drawings the molds A and B are being subjected to pressure by the movement of the lower platen 14 in response to the actuation of the piston 15 which has followed the proper manipulation of the lever 33 by the operator at position 25, the molds C and D having been withdrawn from the machine contemporaneously with the insertion therein of molds A and B. It will be noted that the mold A has been inserted from the left by the operator at position 26 and mold B has been inserted from the right by the operator at position 29, while the mold C has been withdrawn by the operator at position 28, and mold D has been withdrawn of the machine by the operator at position 27. Also the molds C and D have been opened and the upper portions 45 thereof have been placed on supports 47 before the operators at positions 26 and 29 respectively.

The operator at position 27 now removes the molded article in its completed state from the lower portion 48 of the mold D by any suitable means, such as knock out pins (not shown), which may be operated in any desirable manner. The operators at positions 27 and 29 thereupon clean the mold portions 40 and 41 and the overflow chambers 52 and 53, after which they position the insert strips 42 in the portions 40 and 41 and the operator at position 27 thereupon places a suitable amount of the semiplastic work material maintained on the plate 30, in the lower portion 48 of mold D. The operators at positions 27 and 29 then replace the upper portion 45 on the lower portion 48 of the mold D. It will be noted that at this time the upper and lower mold members 40 and 41 of the mold D are not in contact, due to the fact that the amount of work material placed in the member 41 by the operator at position 27 slightly exceeds that required in the completed article. While these operations are being performed by the operators at positions 27 and 29, similar operations are being performed by the operators at positions 28 and 26 respectively upon the upper and lower portions 45 and 48 of the mold C.

These operations take approximately the same time as required for the operation of the machine upon the molds A and B. When the operation of the machine has been completed, the operator at position 25 returns the lever 33 to normal, closing valve 16 to allow the piston 15, the platen 14, and the associated platforms to return to normal. Thereupon the operator at position 29 slides the mold B away from the pressing area along the track 61, while the operator at position 28 slides the prepared mold C toward the pressing area along said track. Simultaneously therewith the operator at position 26 slides the mold A from the pressing area along the track 60, while the operator at position 27 slides the newly filled form D into the machine along the same track to replace the mold A. In this manner the duration of the period during which the machine is idle is reduced to a minimum.

It will be evident from the foregoing description that this invention is particularly adapted to the manufacture of articles wherein the work material must be prepared immediately preceding its insertion into the machine, and wherein such preparation requires a considerable amount of time which is comparable with the duration of the working period of the machine.

What is claimed is:

1. A method of manufacture which comprises contemporaneously removing a plurality of completed articles from and supplying work material to a machine in parallel opposing directions in the same horizontal plane.

2. A method of contemporaneously manufacturing a plurality of articles comprising contemporaneously supplying to a common working position a plurality of portions of work material from a plurality of combined sending and receiving positions in the same horizontal plane and contemporaneously therewith transmitting completed articles from the first to the last mentioned positions.

3. A method of molding articles which comprises heating a supply of work material, contemporaneously loading portions of the work material into a plurality of molds, heating the molds contemporaneously with the loading of the molds compressing work material in previously loaded additional heated molds, and contemporaneously removing a plurality of completed articles from and supplying work material to the machine in parallel opposing directions in the same horizontal plane.

4. A method of molding articles which comprises contemporaneously loading portions of work material into a plurality of molds contemporaneously therewith compressing work material in previously loaded molds, continuously maintaining all of the molds at substantially the same temperature, and contemporaneously removing a plurality of completed articles from and supplying work material to the machine in parallel opposing directions in the same horizontal plane.

5. In a machine for simultaneously molding a plurality of articles, a movable platen and mold unloading and loading table portions on either side of and movable with the platen.

6. In a machine for simultaneously molding a plurality of articles, a movable platen accommodating a plurality of molds and having combined mold loading and unloading platforms attached thereto and movable therewith, and a plurality of ways extending across the platen and platforms for conveying the molds between the platen and the platforms.

7. In a machine for simultaneously molding a plurality of articles from a plurality of portions of work material in a plurality of molds, a platen for supporting the molds, a plurality of platforms adjacent thereto for unloading completed articles from the molds removed from the platen and reloading said molds with work material, and a plurality of ways in the same horizontal plane for transferring the molds between the platen and the platform.

8. In a machine for simultaneously molding a plurality of articles from a plurality of portions of work material in a plurality of molds, a movable horizontal platen having side extensions for supporting the molds containing completed articles and the molds being prepared, a stationary platen above the movable platen, a plurality of tracks extending along the movable platen and extensions thereof, said tracks designed to receive the molds slidable thereon, and means for raising the movable platen to press the molds on the movable platen, between said movable platen and the stationary platen thereabove.

In witness whereof I hereunto subscribe my name this 29th day of January, A. D. 1923.

GUSTAVE ADOLPH GROS.